US006821010B2

(12) United States Patent
Lo

(10) Patent No.: US 6,821,010 B2
(45) Date of Patent: Nov. 23, 2004

(54) DECORATIVE LAMP WITH ILLUMINATED COLOR CHANGEABLE COLUMN

(75) Inventor: David Lo, Taipei (TW)

(73) Assignee: The Holmes Group, Inc., Milford, MA (US)

( * ) Notice: Subject to any disclaimer, the term of this patent is extended or adjusted under 35 U.S.C. 154(b) by 224 days.

(21) Appl. No.: 10/295,101

(22) Filed: Nov. 15, 2002

(65) Prior Publication Data

US 2004/0095781 A1 May 20, 2004

(51) Int. Cl.⁷ .................................................. F21V 7/04
(52) U.S. Cl. ........................ 362/555; 362/551; 362/565; 362/414; 362/251; 362/410
(58) Field of Search ................................. 362/555, 551, 362/565, 414, 251, 410

(56) References Cited

U.S. PATENT DOCUMENTS

| | | | |
|---|---|---|---|
| 2,204,362 A | * | 6/1940 | Illian .......................... 362/565 |
| 5,558,421 A | | 9/1996 | Guastella |
| 6,135,604 A | | 10/2000 | Lin |
| 6,139,174 A | | 10/2000 | Butterworth |
| 6,149,283 A | | 11/2000 | Conway et al. |
| 6,217,188 B1 | | 4/2001 | Wainwright et al. |
| 6,361,198 B1 | | 3/2002 | Reed |
| 2003/0133311 A1 | * | 7/2003 | Robertson et al. .......... 362/555 |
| 2003/0202340 A1 | * | 10/2003 | Wu ............................. 362/101 |

* cited by examiner

*Primary Examiner*—Stephen Husar
*Assistant Examiner*—James W Cranson
(74) *Attorney, Agent, or Firm*—Hoffman & Baron, LLP; Frank E. Marino

(57) ABSTRACT

A decorative lamp with illuminated color changeable column generally includes a base for supporting the lamp on a surface, a translucent column having a first end extending upwardly from the base and a second end opposite the first end, an electrical light socket connected to the second end of the translucent column for removably connecting an electric light bulb thereto and electronic circuitry for operating the lamp. The base of the lamp contains at least one light emitting device therein and the first end of the translucent column is connected to the base adjacent the light emitting device. The translucent column includes at least one fiber optic strand extending from the first end to the second end of the column so that light emitted from the light emitting device is transmitted along a length of the optic strand and is visible through the translucent column.

20 Claims, 3 Drawing Sheets

DECORATIVE LAMP WITH ILLUMINATED COLOR CHANGEABLE COLUMN

FIELD OF THE INVENTION

The present invention relates to a lamp generally, and more particularly to a decorative lamp having an illuminated color changeable column.

BACKGROUND OF THE INVENTION

Lamps used for illumination or decoration typically include a cord, one end of which is plugged into a household outlet and connected at the other end to a base of the lamp. Mounted on the base is typically a lamp body or column and fixed to the lamp body opposite the base is an electrical socket into which an electric light bulb can be removably secured. Such lamps are of a permanent nature, and once the filament of the electric light bulb burns out, the bulb can be removed and a new bulb replaced in the same lamp.

Novelty lamps, such as fiber optic lamps, have long been used for their decorative effects. One example of such a lamp includes a fiber optic lamp having a cylindrical solid wood base with a light source attached in the center of the wood base. The cylindrical solid wood base has a hollow plastic elongated cylindrical section attached at the perimeter of the cylindrical wood base. Approximately one hundred and fifty fibers are located at the center of the plastic cylindrical section and extend therethrough and away from the light source. The fibers extend over the edge of the plastic cylindrical section and droop in a downward direction. Light emitting from the light source travels through the fibers, from tip to tip. However, since the fibers are spaced apart from each other, this lamp provides minimal light and is visible only in dark environments.

Some fiber optic lamps use a conventional incandescent light source and a rotating translucent color wheel located between the light source and the fibers. The color wheel includes windows or gels of various colors to alter the color of the light traveling through the optic fibers. The color wheel rotates to change the colors emitted at the tips of the fibers and to create a sparkling effect. Typically, the manufacturing costs of these types of lamps are relatively high and the color range is usually limited.

Other light sources, such as light emitting diodes (LEDs) have been used in lamps both for decorative and functional purposes. LEDs have many exciting and practical characteristics that make them very attractive for new applications and for use in many types of decorative and novelty lamps. However, for functional purposes, there are some technical limitations such as narrow band spectra, extremely directional light distribution, and reliability concerns. Accordingly, there are several drawbacks from using LEDs as a primary light source for illuminating a room.

Another example of a novelty lamp is a colored light projection-type lamp. A light source is enclosed by a translucent multi-colored rotatable cylinder having various shapes through which the light can project. The light emitted from the light source permeates through the multi-colored and shaped cylinder to thereby create a light show of various colored shapes on the walls and ceiling in the room where the lamp is located. Also, various colors on the cylinder allow the colors projected on the walls and ceiling from the lamp to change as the multi-colored cylinder rotates. Thus, the lamp itself is not a decoration, but instead, the purpose of the lamp is to decorate the lamp's surroundings. Additionally, providing rotating elements to the lamp increases manufacturing costs, as well as the likelihood of the lamp malfunctioning.

Consequently, the lamps mentioned above are typically only used in dark environments for decorative purposes only. In addition, these lamps are typically costly and prone to failure. Accordingly, it would be desirable to provide a low-cost lamp that has decorative light display elements, yet is also fully functional in illuminating a room conventionally. It would further be desirable to provide a decorative fiber optic lamp which can be selectively used in dark or light environments for displaying a light decoration within the lamp that can be seen from all directions.

SUMMARY OF THE INVENTION

The lamp of the present invention generally includes a base for supporting the lamp on a surface, a translucent column having a first end extending upwardly from the base and a second end opposite the first end, an electrical light socket connected to the second end of the translucent column for removably connecting an electric light bulb thereto and electronic circuitry for operating the lamp. The base of the lamp contains at least one light emitting device therein and the first end of the translucent column is connected to the base adjacent the light emitting device. The translucent column includes at least one fiber optic strand extending from the first end to the second end of the column so that light emitted from the light emitting device is transmitted along a length of the optic strand and is visible through the translucent column.

In a preferred embodiment, the electronic circuitry includes a three-way lamp switch for selectively operating the light emitting device and the light socket. The electronic circuitry is preferably disposed on a printed circuit board centrally positioned within the lamp base and the light emitting device is disposed on the printed circuit board. The light emitting device is preferably a light emitting diode and, more preferably, the base includes at least three different colored light emitting diodes, for example, red, green and blue diodes. The electronic circuitry further preferably includes a controller for selectively illuminating the light emitting diodes both individually and in combination. The controller preferably includes a preset program for sequencing through a data pattern to selectively illuminate the light emitting diodes. The controller further preferably allows for gradual increasing and decreasing illumination of the different colored light emitting diodes.

The translucent column may be substantially transparent or pigmented and preferably includes an axial bore therein and a wire conduit disposed within the axial bore for carrying electrical wires from the lamp base to the light socket. The wire conduit preferably includes a reflective outer surface for reflecting light transmitted by the optic strand. The translucent column further preferably includes a plurality of optic strands axially spaced and embedded within the column.

The lamp further preferably includes a shade assembly positioned at the second end of the translucent column for shading a light bulb connected to the light socket. Additionally, the lamp preferably includes a shoulder disposed between the translucent column and the light socket. The shoulder preferably includes a reflective bottom surface adjacent the translucent column for reflecting light transmitted by the optic strands.

A preferred form of the lamp, as well as other embodiments, objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
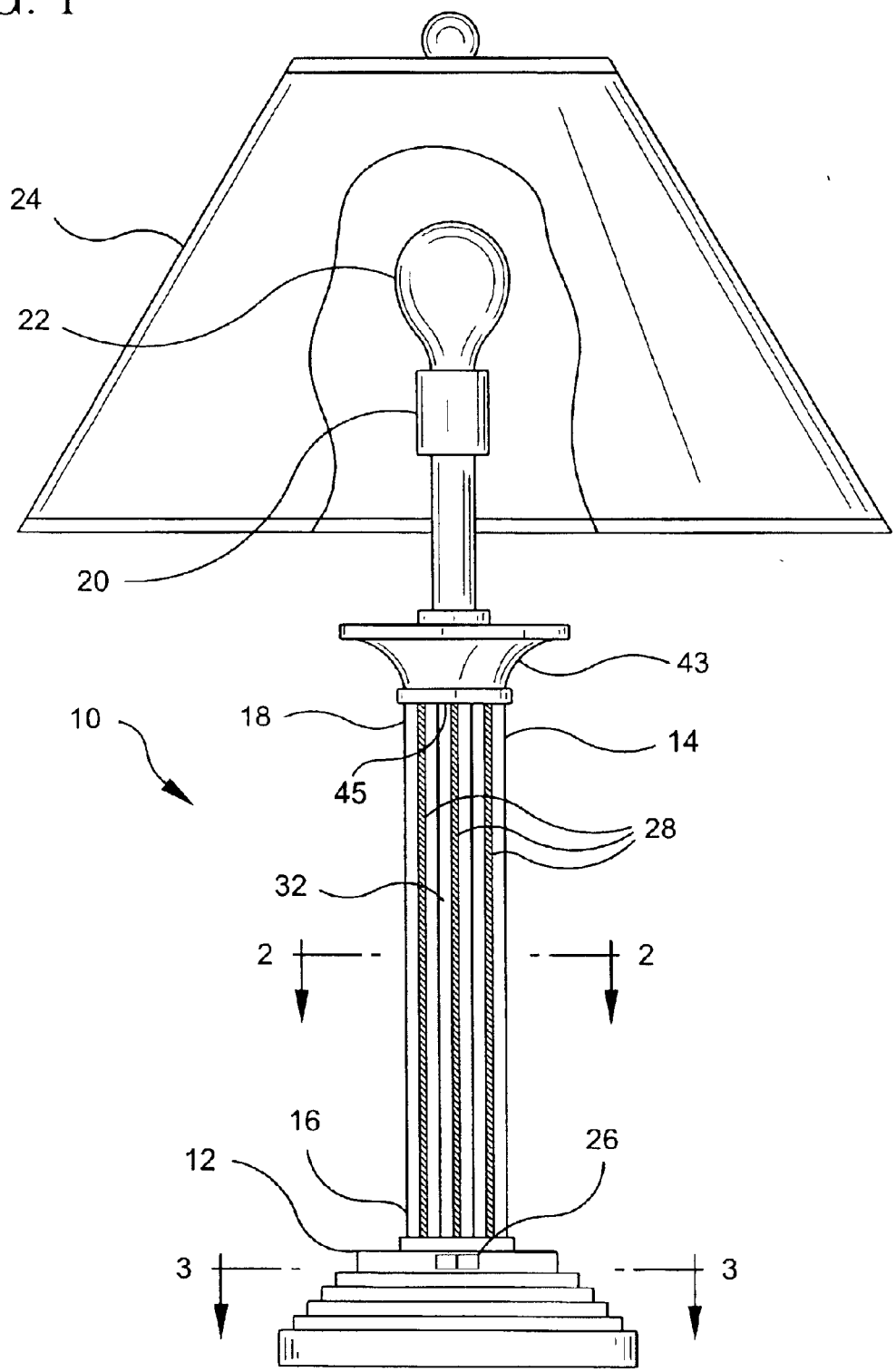
FIG. 1 is a plan view of a decorative lamp having an illuminated color changeable column formed in accordance with the present invention.

Referring first to FIG. 1, a decorative lamp 10 formed in accordance with the present invention generally includes a lamp base 12 for supporting the lamp on a surface, an elongated translucent column or stem 14 and an electrical socket 20 for removably connecting an electric light bulb 22 thereto. The translucent column 14 has a first end 16 attached to a central portion of the base 12 and a second end 18, opposite the first end, connected to the electrical socket 20. The lamp 10 further preferably includes a lamp switch 26 for operating the lamp and a shade assembly 24 connected in a conventional manner at the second end 18 of the column 14 for shading the light bulb 22.

The lamp 10 shown in FIG. 1 is in the form of a table lamp having a base 12 for supporting the lamp on a furniture surface and a lamp switch 26 provided on the base. However, the lamp of the present invention can also take the form of a floor lamp, wherein the base 12 would be adapted for supporting the lamp on a floor surface, the column 14 would be further elongated and the lamp switch 26 would be situated closer to the electric socket 20.

Figure 2:
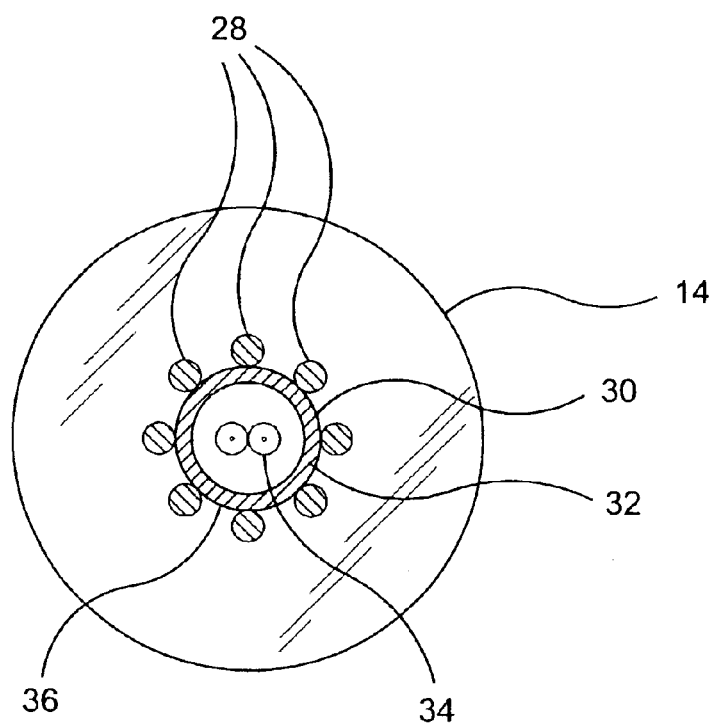
FIG. 2 is a cross-sectional view of the column of the lamp shown in FIG. 1 taken along the line 2—2.

Referring additionally to FIG. 2, the column 14 is made from a translucent material and includes at least one fiber optic strand 28 disposed therein. A translucent material, as defined herein, is any material that allows light to pass therethrough. The translucent column 14 is preferably clear or transparent so that the fiber optic strand 28 is clearly visible therethrough. However, a tinted or pigmented translucent column can also be used. Preferable materials for the column 14 include translucent or transparent durable plastics (e.g., acrylic), glass and quartz materials. The column 14 is preferably cylindrical in shape, although any desired cross-sectional shape, such as rectangular, octagonal, pentagonal, etc., can be utilized. The column 14 further preferably includes an axial bore 30 and disposed within the axial bore is a tubular wire conduit 32 for carrying electrical wires 34 from the lamp base 12 to the electric socket 20. The wire conduit 30 preferably includes a reflective outer surface 36, which will reflect light transmitted by the fiber optic strand 28, as will be discussed in further detail below.

In a preferred embodiment, the column 14 includes a plurality of longitudinal fiber optic strands 28 axially spaced around the central axial bore 30 of the column and extending from the first end 16 of the column along the length of the column to the second end 18. The fiber optic strands 28 are preferably made from a plastic, such as a polymethyl methacrylate polymer (PMMA), or a glass material and are unjacketed so that light applied at an end of the strand will be visible from the side of the strand as the light travels along the strand length. The strands can also be sheathed in a thin skin of clear Teflon to further enhance side reflection of the light along the entire length of the strands. The fiber optic strands 28 are preferably embedded within the column 14, for example, by integrally molding the strands within the column material during extrusion of the column. Alternatively, the strands may be fixed, for example, by a suitable adhesive to the inner surface of the column axial bore 30, or may be fixed to the outer surface of the column. Of course, those skilled in the art will envision other methods of forming and disposing fiber optic strands within the translucent column and the present invention is not limited to the embodiments described above. Again, however, it is preferred to position the fiber optic strands in proximity to the reflective surface 36 of the wire conduit 32.

Figure 3:
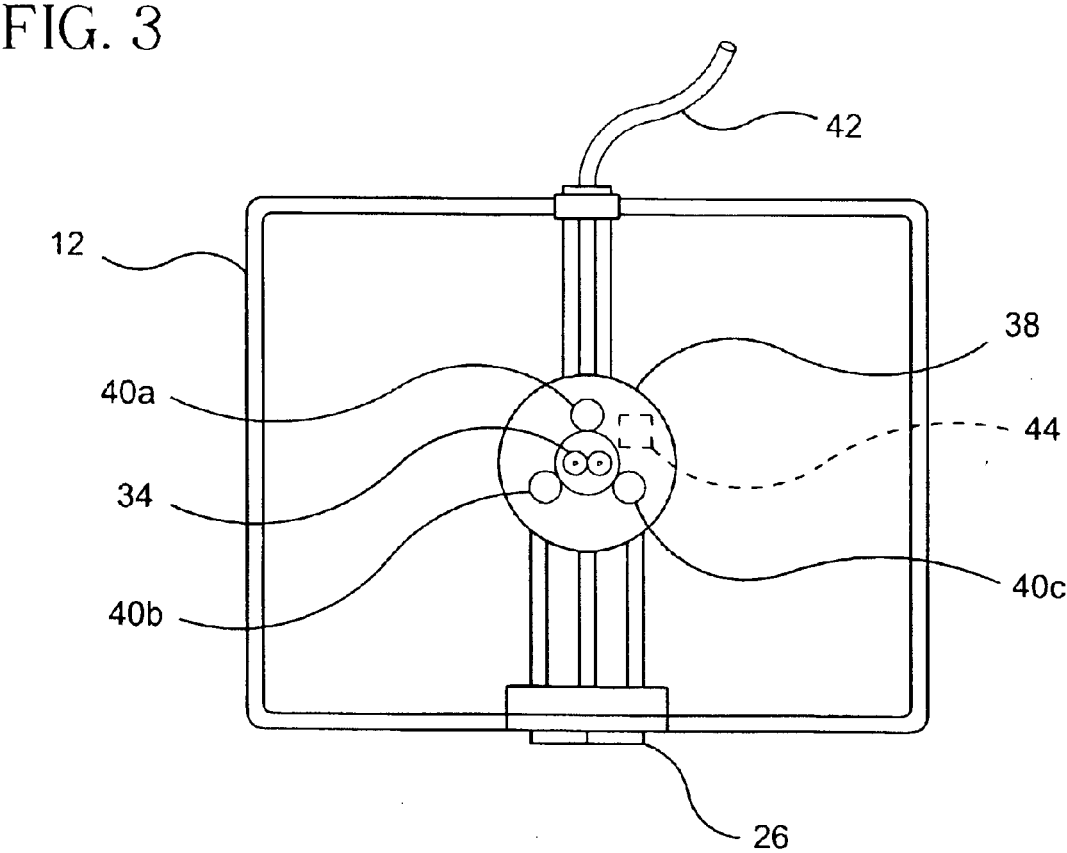
FIG. 3 is a cross-sectional view of the base of the lamp shown in FIG. 1 taken along the line 3—3.

Referring now to FIG. 3, within the lamp base 12 is the electronic circuitry for illuminating both the light bulb 22 and the fiber optic strands 28. The electronic circuitry is preferably disposed on a printed circuit board (PCB) 38 centrally positioned within the lamp base 12. The PCB includes at least one light emitting device 40a, 40b or 40c mounted thereon for providing light to the optical strands 28. The light emitting device 40a, 40b or 40c is preferably a single color light emitting diode (LED), which can be selectively powered on and off by the electronic circuitry. In a preferred embodiment, the PCB 38 includes at least three different colored LEDs 40a, 40b and 40c. More preferably, the PCB 38 includes at least one red LED 40a, at least one blue LED 40b and at least one green LED 40c that are spaced apart from each other. The LEDs are arranged on the PCB so that, when the column 14 is fixed to the lamp base 12, the LEDs are in close proximity to the ends of the fiber optic strands 28 at the first end 16 of the column.

Power is supplied to the lamp 10 through an electric cord 42 connected to the base 12 of the lamp. The lamp 10 is operated by a lamp switch 26, which is preferably a three-way switch for selectively providing power to the light bulb 22, through the electric wires 34, and/or the LEDs 40a, 40b and 40c of the PCB 38. Thus, the light bulb 22 alone can be illuminated, the LEDs 40a, 40b and 40c alone can be illuminated or both the light bulb and the LEDs can be illuminated or turned off The lamp 10 can be assembled in any conventional manner whereby the first end 16 of the column 14 is centrally fixed to the lamp base 12 and the electrical socket 20 is fixed to the second end 18 of the column. In this regard, the wire conduit 32 within the column 14 can be provided with threaded ends (not shown) and hardware (not shown) can be provided to secure the column to the base 12 and to secure the electric socket 20 directly to the wire conduit. Additionally, a decorative shoulder 43 can be provided between the second end 18 of the column 14 and the electrical socket 20 and the column can be retained between the shoulder and the lamp base 12. The decorative shoulder 43 preferably includes a reflective bottom surface 45 adjacent the translucent column 14 for reflecting light transmitted by the fiber optic strands 28. Finally, the lamp shade assembly 24 can be attached in a conventional manner to any of the light bulb 22, the socket 20, the shoulder 43 or the second end 18 of the column 14.

Figure 4:
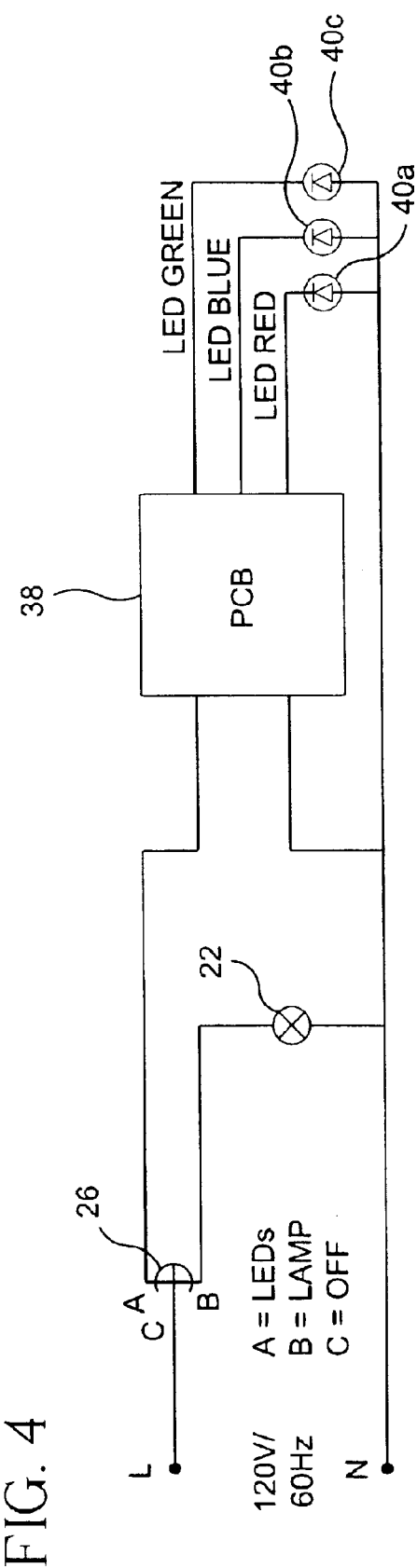
FIG. 4 is a simplified electrical schematic for the electrical circuit of the decorative lamp of the present invention.
Figure 5:
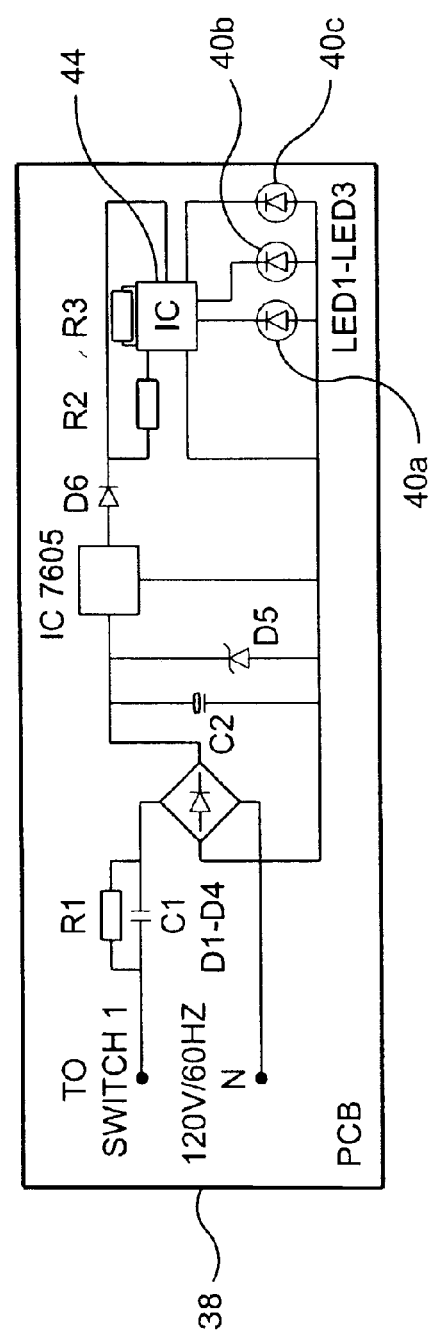
FIG. 5 is an electrical schematic of the electrical circuit PCB shown in FIG. 4.

FIG. 4 is a simplified electrical schematic of the circuit for operating the lamp 10 of the present invention and FIG. 5 is a more detailed electrical schematic of the PCB 38. The circuit includes a power source for providing 120V/60 Hz AC power to the lamp 10. The power source is connected in series with the switch 26 for turning on and off the LEDs 40a, 40b and 40c of the PCB 38 and/or the light bulb 22. The electrical circuit of the PCB 38 includes resistor R1 and capacitor C1, to serve as a filter for the switch 26, and a diode bridge D1–D4 for rectifying the AC voltage to provide DC voltage to the circuit. The circuit further preferably includes an electrolytic bypass capacitor C2, to avoid electrical spikes in the circuit, and a 5V integrated circuit IC 7805 to serve as a linear voltage regulator.

The LEDs 40a, 40b and 40c are driven by a controller 44, which selectively illuminates the LEDs through a preset program when the lamp switch 26 is set to the LED position. The controller 44 is preferably an integrated circuit (IC), such as a programmable ROM or an ASIC, which sequences through a data pattern to sequentially illuminate the LEDs 40a, 40b and 40c. The program data patterns of the controller 44 cause the LEDs 40a, 40b and 40c to be illuminated both individually and in combination. Additionally, the program of the controller 44 allows for gradual increasing and decreasing of power to the LEDs 40a, 40b and 40c so that a "fading" effect can be achieved. Thus, in operation, the red, blue and green LEDs 40a, 40b and 40c are selectively illuminated in various color and intensity combinations.

Because the ends of the fiber optic strands 28 at the first end 16 of the column 14 are in close proximity to the LEDs 40a, 40b and 40c within the lamp base 12, light emitted from the LEDs is carried along the length of the fiber optic strands to the second end of the column. Accordingly, the fiber optic strands 28 are illuminated by the LEDs 40a, 40b and 40c and the translucency of the column 14 permits the illuminated fiber optic strands to be visible from outside the column. The effect is a lamp column 14 that gradually changes color and light intensity as the LEDs 40a, 40b and 40c in the lamp base 12 are selectively illuminated. As a result, a decorative lamp, which has an aesthetically pleasing light display within the lamp column, is provided.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A decorative lamp comprising:
   a base for supporting said lamp on a surface, said base containing at least one light emitting device therein;
   a translucent column having a first end connected to said base adjacent said light emitting device, a second end opposite said first end and at least one optic strand disposed within said translucent column and extending from said first end to said second end, wherein light emitted from said at least one light emitting device is transmitted along a length of said at least one optic strand and is visible through said translucent column;
   a light socket positioned at said second end of said translucent column for releasably connecting a light bulb thereto; and
   electronic circuitry for operating said at least one light emitting device and said light socket.

2. A decorative lamp as defined in claim 1, further comprising a shade assembly positioned at said second end of said translucent column for shading a light bulb connected to said light socket.

3. A decorative lamp as defined in claim 1, wherein said electronic circuitry includes a lamp switch for operating said at least one light emitting device and said light socket.

4. A decorative lamp as defined in claim 3, wherein said lamp switch is a three-way switch for selectively providing power to said light emitting device and said light socket.

5. A decorative lamp as defined in claim 1, wherein said translucent column is substantially transparent.

6. A decorative lamp as defined in claim 1, wherein said translucent column is pigmented.

7. A decorative lamp as defined in claim 1, wherein said translucent column includes an axial bore therein and a wire conduit disposed within said axial bore for carrying electrical wires from said lamp base to said light socket.

8. A decorative lamp as defined in claim 7, wherein said wire conduit includes a reflective outer surface for reflecting light transmitted by said at least one optic strand.

9. A decorative lamp as defined in claim 1, wherein said translucent column includes a plurality of optic strands axially spaced within said column.

10. A decorative lamp as defined in claim 1, wherein said at least one optic strand is embedded within said translucent column.

11. A decorative lamp as defined in claim 1, wherein said electronic circuitry is disposed on a printed circuit board centrally positioned within said lamp base and wherein said at least one light emitting device is disposed on said printed circuit board.

12. A decorative lamp as defined in claim 1, wherein said at least one light emitting device is a light emitting diode.

13. A decorative lamp as defined in claim 12, wherein said base includes at least three different colored light emitting diodes.

14. A decorative lamp as defined in claim 13, wherein said base includes at least one blue light emitting diode, at least one red light emitting diode and at least one green light emitting diode.

15. A decorative lamp as defined in claim 13, wherein said electronic circuitry includes a controller for selectively illuminating said at least three different colored light emitting diodes.

16. A decorative lamp as defined in claim 15, wherein said controller includes a preset program for sequencing through a data pattern to selectively illuminate said at least three different colored light emitting diodes.

17. A decorative lamp as defined in claim 15, wherein said controller selectively illuminates said at least three different colored light emitting diodes both individually and in combination.

18. A decorative lamp as defined in claim 15, wherein said controller allows for gradual increasing and decreasing illumination of said at least three different colored light emitting diodes.

19. A decorative lamp as defined in claim 1, further comprising a shoulder disposed between said translucent column and said light socket.

20. A decorative lamp as defined in claim 19, wherein said shoulder includes a reflective bottom surface adjacent said translucent column for reflecting light transmitted by said at least one optic strand.

* * * * *